July 31, 1951 L. B. HALLMAN, JR 2,562,186
PRESSURE-PATTERN NAVIGATION COMPUTER
Filed Nov. 12, 1947 2 Sheets—Sheet 1
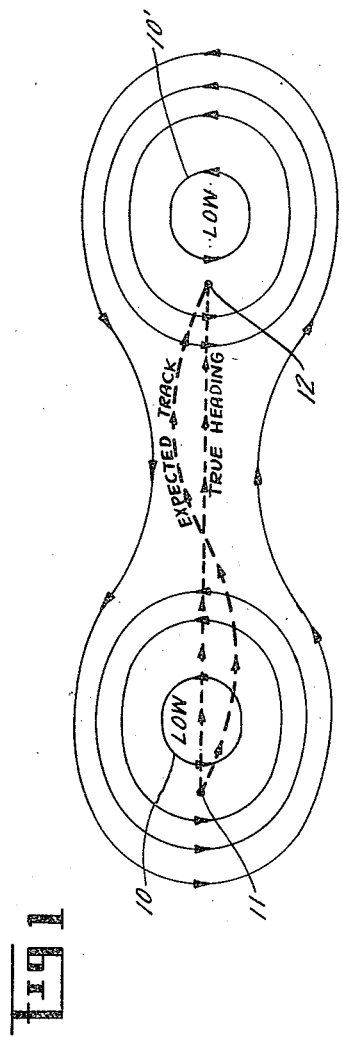
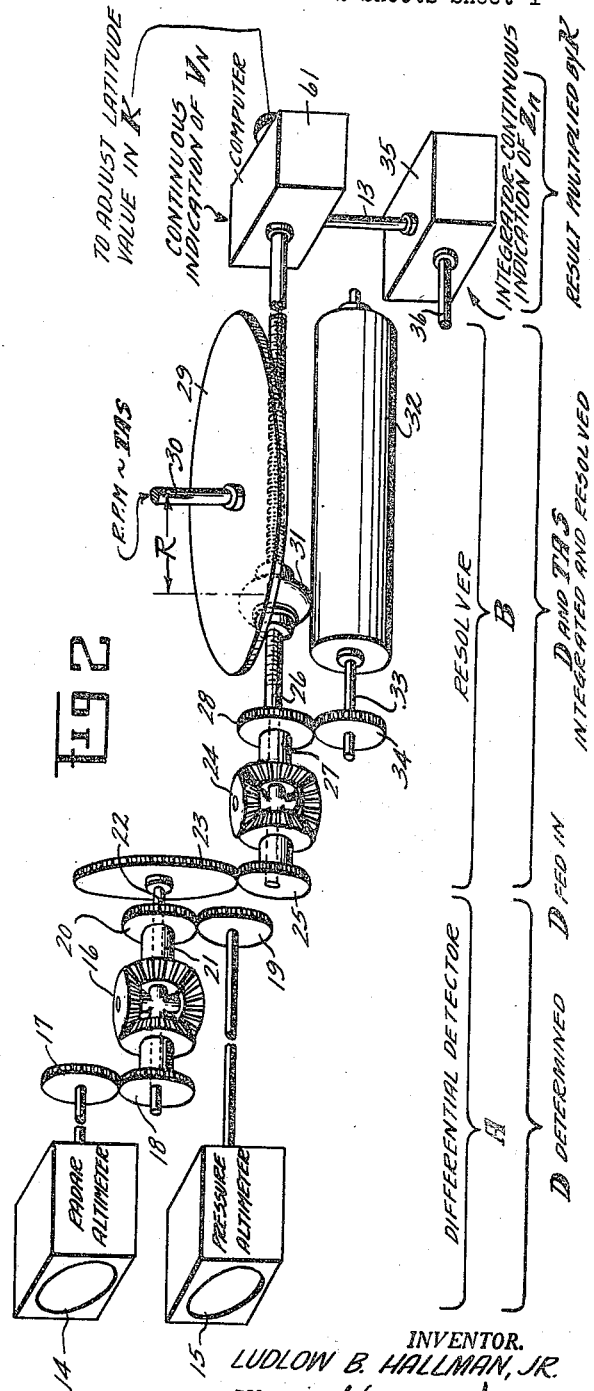
INVENTOR.
LUDLOW B. HALLMAN, JR.
BY
ATTORNEYS

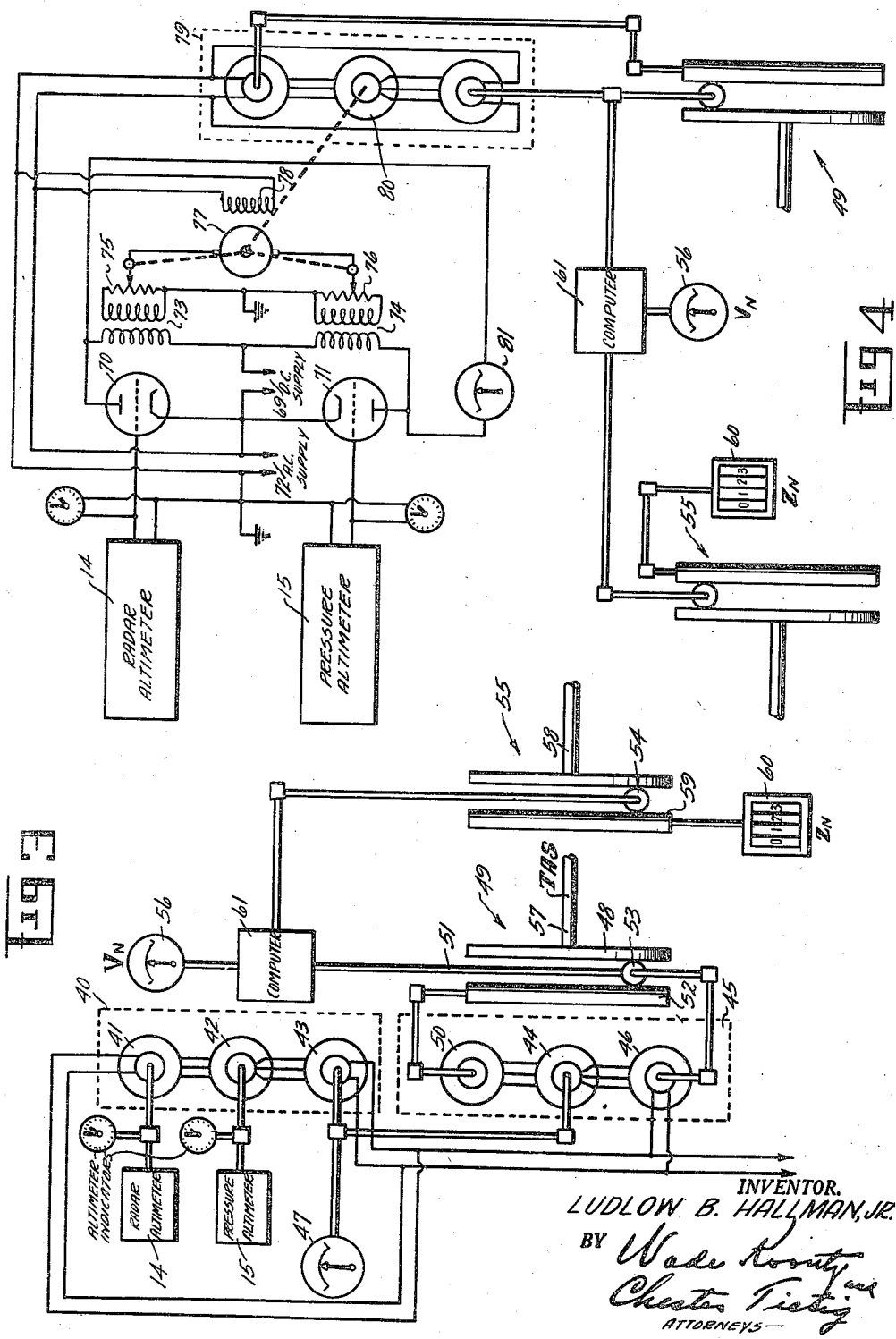

Patented July 31, 1951

2,562,186

UNITED STATES PATENT OFFICE 2,562,186

PRESSURE-PATTERN NAVIGATION
COMPUTER

Ludlow B. Hallman, Jr., Dayton, Ohio

Application November 12, 1947, Serial No. 785,427

4 Claims. (Cl. 235—61)

(Granted under the act of March 3, 1883, as
amended April 30, 1928; 370 O. G. 757)

This invention described herein may be manufactured and used by or for the Government for governmental purposes without payment to me of any royalty thereon.

This invention relates to an airplane navigation instrument which is useful in pressure-pattern navigation. The instrument is a device for automatically and continuously accomplishing the calculations of that kind of pressure-pattern flying which is known as "aerologation," which is already well known. The mechano-electrical methods of computation are also part of the invention. The principles and practice of aerologation are described in the following publications:

1. "The use of pressure altitude and altimeter correction in meteorology," by John C. Bellamy, The Journal of Meteorology, volume 2, No. 1, March 1945.

2. "Aerologation," Bolton, Lambach and Mansfield. Copyright 1945 by Transcontinental and Western Air, Inc.

3. Paper H-2 of the Report of the Electronic Subdivision Advisory Group on Air Navigation, U. S. Air Corps.

4. Article, "Aerologation," by R. Mansfield, Air-Sea Rescue Bulletin, vol. III, No. 6.

One object of the invention is to provide such an instrument for indicating the geostrophic wind velocity and the net drift of the aircraft resulting therefrom continuously, when the radio and pressure altimeter information is furnished in the form of shaft rotational positions.

Another object is to provide an electrical modification of the above instrument for like indications when the radio and pressure altimeter information is furnished in the form of D.-C. voltages.

Fig. 1 is a pressure pattern map illustrating the simplest case of aerologation.

Fig. 2 is a schematic diagram of an aerologometer which utilizes mechanically imparted data.

Fig. 3 is a schematic diagram of an aerologometer which utilizes an electro-mechanical system including an electrical synchro differential detector and integration-resolvers.

Fig. 4. is a schematic diagram of an aerologometer using a potentiometric circuit and an electrical differential detector with a mechanical computer for $V_n$ and $Z_n$.

Referring now to Fig. 1, 10 and 10' are areas of low atmospheric pressure some hundreds of miles apart. 11 is the point of origin of an airplane flight and 12 is its destination. A true heading between 11 and 12 would be the straight dashed line so labeled, however in point of time, it would only be the shortest course if it could be followed. As a practical matter, it cannot be accurately followed on account of drift caused by rotational winds about the low areas. If the dashed line labeled "expected track" be followed, the elapsed time would be the shortest possible. It is an object of this invention to provide means to determine this course.

The heading of the aircraft is maintained constant along the line labelled "True heading." Drift takes place and the airplane is gradually swept from the left to the right of a true heading. Oppositely directed drift now takes place because the airplane has entered the area of Low 10'. The drift path is so adjusted, with the aid of the calculations furnished by the apparatus which I have invented, that the destination 12 lies on the path.

While the pattern shown in Fig. 1 is quite simple, the same basic principles apply in the case of the more complex patterns usually encountered. It will be noted that the aircraft "drifts" with the geostrophic winds, but that the heading of the aircraft is so adjusted with respect to the pressure pattern that the resultant drift is to the flight terminus.

The general pressure pattern involved at any particular altitude during any particular flight can be obtained from the forecast weather data. It is, however, important to have facilities available for continually monitoring the actual pressure pattern encountered during the flight so that the forecast maps can be corrected as required and the necessary changes in heading accomplished. The Bellamy drift formula as set forth in the article in the publication "The Journal of Meteorology, volume 2, No. 1," previously cited, provides a means for accomplishing this through readings of absolute altitude and pressure altitude taken at certain specified intervals. The formula may be stated in two forms, one of which gives the geostrophic wind velocity component normal to the aircraft track during a specified interval. The second form, in effect, integrates the velocity component over a period of time and gives the total drift normal to the course at the end of the given time interval. These forms are stated in (1) and (2) below:

$$V_n = K \frac{D_2 - D_1}{X} \qquad (1)$$

$$Z_n = K \frac{D_2 - D_1}{\text{T. A. S.}} = K_n (D_2 - D_1) \qquad (2)$$

where:

X = air distance in nautical miles between the geographical points 11 and 12 at which readings $D_1$ and $D_2$ are made as indicated in Fig. 1.

$D_1$ = true altitude, as measured by the radio altimeter, minus the pressure altitude at the start of the run.

$D_2$ = true altitude minus the pressure altitude at the end of the run.

K = 21.47/sin lat.

T.A.S. = true air speed.

$V_n$ = geostrophic wind velocity component, in knots, normal to the aircraft track.

$Z_n$ = net drift (in nautical miles) normal to the desired flight path.

$Z_n$ is a particularly valuable quantity to monitor constantly during the flight since it provides a direct means of continually checking the forecast pressure pattern. This is apparent from Fig. 1. The net deviation of the expected track from the direct track may be plotted in nautical miles and thereby measured as $Z_n$ during the flight.

While all of the above can be accomplished by taking simultaneous readings of the pressure and radio altimeters and making use of (1) and (2) for computation, the application of the method would be greatly facilitated if instruments were provided which would read $Z_n$ and D or $V_n$, directly. The aerologometer is such a device.

The aerologometer is therefore an instrument for continually monitoring and indicating the following quantities, a knowledge of which is essential to successful over-water aircraft navigation utilizing pressure-pattern techniques:

a. The geostrophic wind velocity component at right angles to the heading of the aircraft.

b. The net drift of the aircraft which results from the geostrophic wind during any given flight interval.

The apparatus shown in Fig. 2 includes a differential detector A and a computer B so arranged as to continuously indicate the value of $V_n$ or which appears as an angular value of the rotated position of the output shaft 63 of a second computer 61. The sources of input data are a known type of radar altimeter 14 generally known as a terrain clearance indicator and a bellows actuated barometric pressure responsive altimeter 15 such as the well known Kollsman type such as shown in Reissue Patents 18,306, 20,948 and U. S. Patent 2,034,909. The altimeter units 14 and 15 each include well known torque amplifying repeater mechanism (not shown) which enable the instrument indications to be converted to angular rotation of an output shaft. The output of the radar altimeter unit 14 drives a gear 17 meshing with a gear 18 which in turn drives one of the side gear inputs of a conventional bevel gear differential 16. Spur gears 19 and 20 connect the output of the pressure altimeter 15 to the second bevel side gear input of the differential 16. The carrier forming the output of the differential 16 is supported by a shaft 22 journalled in the hubs of the side gears of the differential and extending through the hub 21. The shaft 22 has a large gear 23 mounted thereon which drives a smaller gear 25 which drives one input bevel side gear of a second bevel gear differential 24 with the gearing ratio of about ten to one.

It will be apparent that slow angular displacement of the output shafts of the altimeter units 14 and 15 of Fig. 1 due to relative change in the actual and pressure altitudes will feed input values to differential 16, the carrier of which will be angularly displaced proportional to the difference in the input values. The input to one side of the second differential 24 will also be proportional to the output of differential 16 multiplied by the ratio between gears 23 and 25.

The second differential 24 forming part of the computer mechanism B, Fig. 2, has its carrier connected to drive an output shaft 26 which passes through the hollow hub 27 of the second input bevel side gear. The hub 27 has an input gear 28 secured thereon.

The shaft 26 is threaded to form a lead screw which has a disc 29 mounted parallel therewith and adapted to be rotated by means of a vertical shaft 30 with a speed proportional to the instant value of the true air speed of the aircraft on which the instrument is mounted. The disc 29 is adapted to frictionally engage the ball surface of a nut 31 centrally threaded to rotate and to be moved axially on the lead screw 26. The ball surface of nut 31 also frictionally engages a friction roller 32 which has its shaft 33 connected by a spur gear 34 to the second input gear 28 of the differential.

The angular rotation of shaft 26 which is a measure of the value of $V_n$ serves as an input to the second computer in the form of a conventional variable ratio drive or multiplying mechanism 61 which may be of the type disclosed in "Machine Design," September 1945, page 114, Fig. 12. The multiplying factor K is set into the multiplier 61 by a setting knob and the value of K is 21.47/sine of latitude and accordingly is not constant but will vary with the latitudes over which the proposed flight will take place.

The angular position of the output shaft 13 of the second computer 61 is a measure of the instant value of the geostrophic wind component normal to the course or $V_n$ and in order to obtain the total drift in a given time it is necessary to integrate the values of $V_n$ with respect to time and this can be readily accomplished by means of the integrator 35 which may be of the shiftable roller type engaging a disc rotated at constant speed, the rotation of the roller driving an output shaft 36 which may drive a suitable digital counter (not shown) but may be of the well known Veeder type such as shown in Fig. 5. A suitable integrator is shown in U. S. Patent 1,317,915.

For an understanding of the theory of operation of the device of Fig. 2 which is also applicable to an understanding of other embodiments of the invention the following explanation is given.

By inspection of Fig. 1 it is readily seen that wind velocity will continually vary in traversing a pressure pattern and accordingly there will be a corresponding change in barometric pressure or pressure altitude even where absolute altitude remains constant at constant compass heading. Under the foregoing conditions so long as there is any drift there will be a continuous slow relative change between the indications of the radar or absolute altitude indicator 14 and the pressure altitude indicator 15, Fig. 2, with a corresponding pair of inputs to the first differential 16.

The difference between the inputs to the differential 16, Fig. 2, will appear as a slow angular displacement of shaft 22 from an initial position which displacement suitably increased by gears 23 and 25 appears as a magnified input to the second differential 24. If we assume ball roller 31 initially at the center of disc 29 rotation of the carrier of differential 24 will cause an angular displacement of lead screw 26 which will shift the roller 31 to the right or left of the center of disc 29. The displacement of ball roller 31 from center will cause the same to be rotated by disc 29 causing rotation of roller 32 in a direction which through gears 34 and 28 will apply a second rotary input to the differential 24 tending to reduce the angular rotation of the carrier and output lead screw 26 and this process will continue until the ball roller 31 reaches a position such as indicated by radius R in Fig. 2. At the equilibrium position the feedback input by gear 28 to the differential 24 will be exactly equal and opposite to the input from gear 25 and rotation of the carrier of differential 24 will cease with a corresponding cessation in rotation of lead screw 26 and ball roller 31 will continue to rotate at a fixed radius from the center of disc 29. For every new value of input from differential 16 to differential 24 there will be a new equilibrium position for the ball roller 31 provided the speed of disc 29 has not changed.

It will be readily understood by comparison with the first form of the Bellamy drift formula that the output of differential 16, Fig. 2, is the instant value of the difference between the initial value of the relative absolute and pressure altitudes and the instant relative values of these quantities and accordingly this output which may be called $\Delta D$ is equal or proportional to the term $(D_2 - D_1)$ of the Bellamy drift formula.

If the disc 29 is rotated at a speed corresponding to the true air speed of the aircraft the total number of revolutions occurring in the time interval between in initial point and at the point in question will be equal to the air miles flown in the small time interval $t$ which may be called $\Delta X$. The rotation of ball roller 31, roller 32 and gears 34 and 28 is proportional to $\Delta X$ times $2\pi R$ in any small time interval, where R is the radius of the ball roller 31 from the center of disc 29, Fig. 2.

Then if the inputs to differential 24, Fig. 2, are to balance for equilibrium;

$$\Delta X \times 2\pi R = C_1 \Delta D$$

where $C_1$ is a proportionality factor, or combining constants;

$$R = C_2 \frac{\Delta D}{\Delta X}$$

or R is a measure of $$\frac{\Delta D}{\Delta X}$$

and since the rotation of shaft 26 is dependent upon R, the angular position of shaft 26 is also proportional to $$\frac{\Delta D}{\Delta X}$$

and after multiplication by the appropriate constant of proportionality and by the factor K, the result will be a solution of the Bellamy drift Formula No. 1 for the value of $V_n$ or the geostrophic wind velocity component in knots, normal to the aircraft track. The angular position of the output shaft 13 of the computer 61 accordingly supplies an input equal to the instant value of $V_n$ to the integrator 35 which integrates the value of the variable $V_n$ with respect to time to obtain the total drift in knots normal to the course or $Z_n$.

An electromechanical embodiment of the invention is illustrated in Fig. 3 which differs from the device of Fig. 2 only in the use of electrical differential devices 40 and 45 of known type in lieu of the bevel gear differentials 16 and 24 of Fig. 2. The electrical differentials 40 and 45 are of a type widely employed in electrical repeater systems and known as differential Selsyns or synchros.

Referring to Fig. 3 it is seen that the output shaft of the radar or absolute altimeter 14 of the same character as illustrated in Fig. 2 is connected to rotate the rotor of the Selsyn or synchro generator 41 the rotor of which is fed with alternating current from a suitable supply source. The stator of generator 41 has an output of three alternating current voltages which are dependent on the angular displacement of the rotor and is fed to the stator of a differential Selsyn 42. The rotor of differential 42 is drivingly connected to the output of the pressure altimeter unit 15 similar to the same unit of Fig. 2.

The rotor of differential Selsyn 42 is electrically connected to the stator windings of a Selsyn motor 43 and the rotor of which is fed from the same alternating current supply as the rotor of generator 41. The rotor of motor 43 will then rotate through an angular position corresponding to the difference between the relative rotations of the rotors of generator 41 and differential 42 and accordingly functions similar to the differential 16 of the device of Fig. 2 to indicate the quantity $(D_2 - D_1)$ or the $\Delta D$ of the Bellamy drift Formula 1 as described with respect to the operation of the device of Fig. 2 and the $\Delta D$ may be indicated by the indicating device 47.

The Selsyn or synchro motor 43 through suitable shaft and gearing connections transmits its angular rotation to the rotor of a differential Selsyn 44 of a second differential assembly indicated by the reference numeral 45. The output of the differential positions the rotor of a Selsyn motor 46 which is connected by suitable shafts and gearing to drive a lead screw 51 which is adapted to axially shift a roller nut 53 of a variable speed computer generally indicated at 49. The roller 53 engages a disc 48 driven in accordance with the true air speed of the aircraft by shaft 57. Rotation of the roller nut 53 by disc 48 drives roller 52 which is connected to the rotor of the Selsyn generator 50, the stator of which is electrically coupled to the field of the Selsyn differential 44 and serves to cancel the output signal thereof so that the roller nut 53 will be positioned at a radial distance from the center of shaft 57 so that the feed-back signal developed by Selsyn generator 50 will equal and oppose the signal output of Selsyn differential 44 to stop motor 46 in an equilibrium position.

The operation of electrical differential 45 corresponds to the action of the second differential 24 of the device of Fig. 2 and the rotation of lead screw 51 gives a measure of $V_n$ in the same way as described in relation to operation of the device of Fig. 2 and supplies an input to the computer 61 for the purpose of multiplication by the latitude factor K the actual value of the quantity $V_n$ being available on the indicator 56. A suitable multiplying mechanism is disclosed in "Machine Design," September 1945, page 113.

The purpose of the second integrator 55 is to compute $Z_n$. In this instrument, the ball 54 is positioned the same distance from the center line of a shaft 58 as the ball 53 is from the center line of the shaft 57. Thus the degree or amplitude of angular motion imparted to the roller 59 of integrator 55 at any given time is directly proportional to $V_n$ since the drive shaft 58 and the disc are driven from a constant speed source (not shown). 60 is a counter mechanism which may be of the Veeder type and which is driven by the roller 59. It will count and read the net total revolutions of the roller 59 and may therefore be calibrated to read $Z_n$ in any convenient unit.

Electronic form of aerologometer

Fig. 4 shows functionally, in diagrammatic form, a computer which accepts data from the pressure and radar altimeters in the form of D.-C. voltages; the amplitude of voltage output of both altimeters being a known function of altitude. The radar and pressure altimeter data is respectively fed to the grids of two vacuum tubes, 70 and 71, connected in "push-pull." This general type of circuit is well known to those skilled in the art and will not be described further. An A.-C. supply voltage 72 is connected in series with the common input connection 69 to tubes 70 and 71. 73 and 74 are identical transformers connected in series in the plate circuits of 70 and 71. 75 and 76 are potentiometers of a standard type which are mechanically connected to the armature, 77, of a motor the field winding, 78, of which derives its excitation from the A.-C. supply connected in the common input circuit of tubes 70 and 71. The frequency of the A.-C. supply must be suitable for use with transformers 73 and 74, the armature 77, the winding 78, and also the differential synchro 79, and will normally have a fixed value between 60 and 800 cycles per second. The operation of this equipment is such that when equal voltages are provided by both altimeters 14 and 15, the input circuits of tubes 70 and 71 are balanced and the net A.-C. voltage appearing across transformers 73 and 74 is zero. There is, thus, no motion of the armature 77. If there is a difference in output of the two altimeters 14 and 15 the resulting A.-C. voltage across one transformer is greater than that across the other and the unbalanced voltage causes the armature 77 to rotate in a direction determined by whether the greater voltage appears across transformer 73 or 74. When armature 77 rotates, it also moves the contact arms of the potentiometers 75 and 76 in such a manner that the voltage from the transformer having the lesser voltage developed across its terminals is increased, while the voltage from the transformer having the greater voltage developed across its terminal is decreased. The rotation of armature 77 will continue until the net voltage across its terminals is zero. Thus the instantaneous angular rotation of armature 77 is proportional to the variation in D at any instant, D being the difference in readings between the altimeters. A suitable A.-C. meter 81 can be used to indicate the net value of D at any instant when connected as shown to read the total A.-C. voltage unbalanced across the plates of the tubes 70 and 71. The motor 77 acts at the output terminals of servo-system which functions to translate the voltage unbalance across the grids of tubes 70 and 71 which is amplified across the plates of these tubes, causing the armature of motor 77 to assume an angular position proportional to the unbalance originating at altimeters 14 and 15. The rate change in angular rotation of armature of motor 77 following directly the rate change of the voltage differential across the grids of tubes 70 and 71.

The motion of the armature 77 is imparted to the differential 80 of a differential synchro 79 which is identical with that designated 45 in Fig. 3. The synchro 79 is arranged to operate into a ball, disc and roller mechanism 49 in such a manner that it furnishes a value which, when multiplied by K by the computer 61, becomes $V_n$. The operation is similar to that of the mechanism 49 described in connection with Fig. 3. A second integrator 55 is driven from the lead screw of the ball, disc, and roller mechanism 49 and is identical with the device of the same designation in Fig. 3. A $V_n$ indicator 56 and a $Z_n$ counter 60 are arranged as in Fig. 3 and functions in the manner described in connection with that figure.

I claim as my invention:

1. A device for use in aircraft for determining the geostrophic wind velocity component normal to the course of the aircraft comprising a radar altimeter for measuring absolute altitude, a barometric pressure responsive altimeter for measuring the pressure altitude, first difference comparing means operatively connected to said altimeters and developing an output proportional to the difference between the altitudes as measured by said altimeters, a computer means operatively associated with said first difference comparing means and including a second difference comparing means having a pair of input means and an output means, a first one of said inputs being operatively connected to said first difference comparing means to receive the output therefrom, follow-up means for developing an output proportional to the instant true air speed and operatively connected to the second input means of said second difference comparing means, control means for said follow-up means for varying the magnitude of the output of said follow-up means to equal and oppose the unbalance of said second difference comparing means, an operative connection between the output means of said second difference comparing means and said follow-up control means for actuating the latter and multiplying means also actuated by the output means of said second difference comparing means for multiplying the output of said second difference comparing means by a factor dependent upon latitude to obtain a resultant output directly proportional to the desired velocity component of the geostrophic wind.

2. A device for use in aircraft for determining the geostrophic wind velocity component normal to the course of the aircraft comprising a radar altimeter for measuring absolute altitude, a barometric pressure responsive altimeter for measuring the pressure altitude, difference comparing means operatively connected to said altimeters and having an output shaft angularly displaced in accordance with the difference in the respective altitudes measured by said altimeters, a differential having a pair of input shafts and an output shaft, the rotary displacement of the output shaft being dependent upon the algebraic sum of the displacements of the input shafts, means operatively coupling the output shaft of said difference comparing means and one of said differential input shafts, a variable speed drive having an output shaft drivingly connected to the other of the input shafts of the differential, said variable speed drive having a rotary input means rotated at a speed in accordance with the value of the existing true air speed, control means for said variable speed drive and adapted to control the direction and magnitude of the output thereof, means operative in response to angular displacement of the output shaft of said differential for actuating said control means in a sense and with a magnitude such as to cause equal and opposite speeds of rotation of the differential input shafts and a corresponding adjusted position of the differential output shaft, the adjusted position of the differential output shaft being a measure of the desired wind velocity component and means actuated by said differential output shaft for multiplying the displacement thereof by a factor dependent upon latitude to give an output which is equal or directly proportional to the true value of the desired wind velocity component.

3. A computing device for use in aircraft for determining the geostrophic wind velocity component $V_n$ normal to the course of the aircraft by continuously solving the drift formula $$V_n = K\frac{(D_2-D_1)}{X}$$

where K is a constant dependent on latitude, the quantity $(D_2-D_1)$ is the change in the difference between absolute and pressure altitudes between determined geographic points in the flight of the aircraft and X is the distance flown between said points, said device comprising a radar altimeter, a pressure altimeter, a push-pull vacuum tube circuit, said altimeters being adapted to furnish D.-C. voltage to the grids of the tubes thereof, a pair of transformers connected in the plate circuits of said tubes, a potentiometer across the output winding of each transformer, a motor armature mechanically connected to operate said potentiometers the instantaneous angular position of the motor armature being proportional to the value of $D_2-D_1$ and a motor field thereof electrically connected to an A.-C. supply from a common input circuit for said tubes, a differential synchro detector adapted to receive and to amplify differential signals from the radar and pressure altimeters, a mechanical connection between the said armature and the differential element of said synchro detector, a variable speed device, the instantaneous speed of which is proportional to the true air speed, and which device is adapted to receive the mechanical output of said synchro detector and combine same with the true air speed of the aircraft, and a computer adapted to multiply the result by K of said formula to give the value of $V_n$.

4. A computing device as claimed in claim 3 in which integrating means are provided operatively coupled to the last named computer, said integrating means being adapted to integrate the value of $V_n$ with respect to time to obtain the total drift during flight.

LUDLOW B. HALLMAN, JR.

REFERENCES CITED

The following references are of record in the file of this patent:

UNITED STATES PATENTS

| Number | Name | Date |
|---|---|---|
| 1,985,981 | Edwards | Jan. 1, 1935 |
| 2,134,901 | Wey | Nov. 1, 1935 |
| 2,377,898 | Myers | June 12, 1945 |
| 2,378,910 | Chafee et al. | June 26, 1945 |
| 2,403,117 | Peters | July 2, 1946 |
| 2,404,011 | White | July 16, 1946 |
| 2,425,317 | Harris | Aug. 12, 1947 |
| 2,426,658 | Wooldridge | Sept. 2, 1947 |
| 2,476,269 | Blackman | July 19, 1949 |